United States Patent [19]

Nakamura

[11] 3,951,483

[45] Apr. 20, 1976

[54] CONICAL ROLLER BEARING

[75] Inventor: Takeshi Nakamura, Samukawa, Japan

[73] Assignee: Nippon Seiko Kabushiki Kaisha, Tokyo, Japan

[22] Filed: June 3, 1974

[21] Appl. No.: 475,889

Related U.S. Application Data

[63] Continuation-in-part of Ser. No. 318,423, Dec. 26, 1972, abandoned.

[52] U.S. Cl............................. 308/214; 308/180; 308/202; 308/216
[51] Int. Cl.².................... F16C 13/02; F16C 19/00
[58] Field of Search .......... 308/180, 174, 214, 216, 308/202, 207 R, 210

[56] References Cited

UNITED STATES PATENTS 2,071,628　2/1937　Hedgcock ........................ 308/180

Primary Examiner—M. H. Wood, Jr.
Assistant Examiner—Richard A. Bertsch
Attorney, Agent, or Firm—Cooper, Dunham, Clark, Griffin & Moran

[57] ABSTRACT

A conical roller bearing comprising an outer race, an inner race and conical rollers wherein at least one of the tapered raceways of the outer and inner races and the bus line of each of the conical rollers are engaged with each other at an angle in the absence of a radial load imparted to the bearing.

7 Claims, 8 Drawing Figures

Δt2 > Δt1

CONICAL ROLLER BEARING

CROSS-REFERENCE

This is a continuation-in-part of our co-pending application Ser. No. 318,423 filed on Dec. 26, 1972, now abandoned.

BACKGROUND OF THE INVENTION

1. Field of the Invention

This invention relates to a conical roller bearing, and more particularly to an improved conical roller bearing which may be used at a location of a support shaft which is subject to deflection (tilting) when the bearing is rotated under a load.

2. Description of the Prior Art

To provide a great load capacity and prevent skewing of rollers during their rotation, conical roller bearings have generally been constructed as shown in FIG. 1 of the accompanying drawings, wherein the extension of the tapered raceway 11a of an inner race 1a, the extension of the tapered raceway 21a of an outer race 2a and the axis passing through the center of a roller 3a are in accord with one another at a point Pa on the axis passing through the center of the roller.

However, where such conventional bearings are used, for example, as the support bearings for the semi-floating rear axle of a motor vehicle as shown in FIG. 2, a load W imparted to the bearing (including the dead weight of the vehicle body and a load) causes the axle 4a to be tilted by an angle Oa with respect to the horizontal axis (this angle being of the order of 10 to 20 minutes for flat road conditions at 15 to 45 minutes when cornering), and this in turn tends to force the bearing to follow such tilting of the axle. Therefore, a roller 3a which is then within the main-load-zone (upper side in the drawing) is subject to a great magnitude of force (edge load) in the smaller-diametered side wall portion thereof while a roller which is then within the sub-load-zone (lower side in the drawing) is subject to moment and thrust loads as the result of the above-described tilting of the axle 4a.

For the prevention of such edge load, it has generally been customary to apply a large crowning to the rollers of the bearing, the inner race 1a or the outer race 2a, to thereby alleviate the effect of the edge load. However, the amount of the crowning available for this purpose was rather limited in relation to the load capacity, and more specifically, a maximum of 5 minutes or so has only been allowed for the tilting of the axle 4a. Thus, the bearing has followed the tilting of the axle 4a which is within the aforesaid range of angle, so that prevention of the edge load has been impossible and in addition, the load capacity has been reduced.

SUMMARY OF THE INVENTION

It is an object of the present invention to provide a bearing which enjoys a long service life.

It is another object of the present invention to provide a bearing which has a great load capacity.

It is still another object of the present invention to prevent the edge load from being imparted to the conical rollers and raceways located within main-load-zone in the bearing when the axle supported by the conical roller bearing is tilted, thereby eliminating the flaking of the bearing.

Other objects and advantages of the present invention will become apparent from the following detailed description taken in conjunction with the accompanying drawings.

DESCRIPTION OF THE PREFERRED EMBODIMENTS

Figure 3:
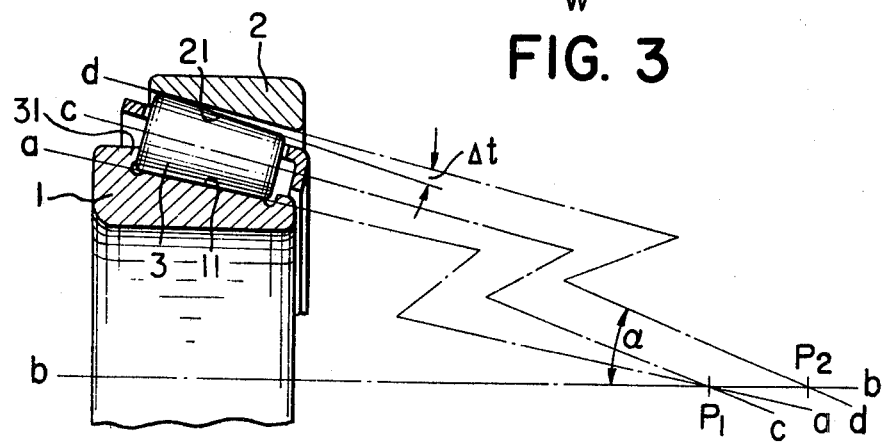
FIG. 3 is a vertical cross section of a conical roller bearing according to an embodiment of the present invention.
Figure 7:
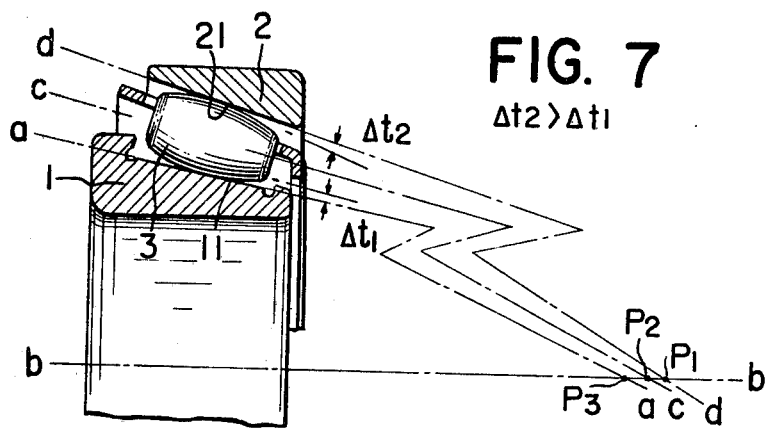

Referring now to FIG. 3, there is shown an embodiment of the present invention which includes an inner race 1, an outer race 2 and conical rollers 3 (only one of which is shown). The conical roller 3 has a straight portion at a part of the rolling surface thereof, and has a crowning applied to each end portion thereof. The straight portion may be substantially rectilinear and provided with a crowning of large crowning radius as shown in FIG. 7. The conical roller is inclined so that the axis thereof intersects the horizontal at a point $P_1$, and the roller is formed with a conical taper which is intersected by the axis c—c also at the point $P_1$.

It will thus be seen that the inner race 1 and the roller 3 are formed in the same correlations as those in the conventional conical roller bearing.

The outer race 2 has in the inner periphery thereof a tapered raceway 21, which is inclined at such an angle $\alpha$ that the extension d—d thereof intersects the horizontal axis b—b at a point $P_2$ displaced outwardly of the point $P_1$.

In other words, the outer race is so formed that, when it is assembled to the inner race 1 and roller 3, there is a differential angle $\Delta t$ between the tapered raceway 21 and the bus line of the roller 3. The differential angle $\Delta t$ is selected, in view of the angle of inclination of the vehicle axle during the use of the bearing, within such a range that the edge load is minimum during the rotation of the bearing under a load. An application of the so constructed conical roller bearing to the semi-floating rear axle of a motor vehicle, as shown in FIG. 4, will now be described.

Figure 4:
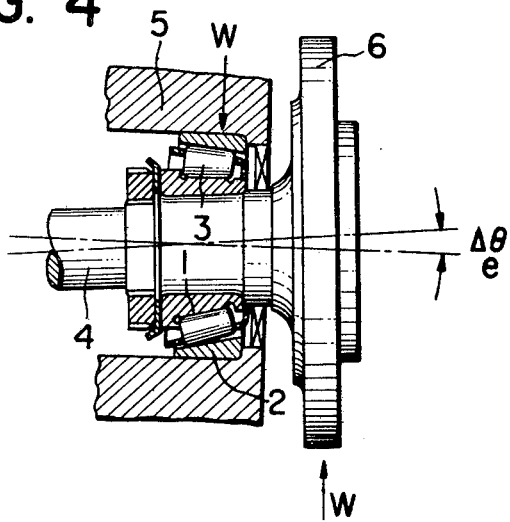
FIG. 4 is a view similar to FIG. 2 but showing the bearing of FIG. 3.

In FIG. 4, numerals 1, 2 and 3 designate the inner race, outer race and rollers, respectively, of the conical roller bearing according to the present invention. The outer race 2 is attached to an axle tube 5 and the inner race 1 is attached to the axle 4. Numeral 6 designates the flange of the axle on which a tire (not shown) may be mounted.

The axle 4 is tilted by an angle $\Delta\theta$ with respect to the horizontal axis due to the sum of the dead weight of the vehicle body and the load imparted to the vehicle. In the bearing, however, the angle of inclination $\alpha$ of the tapered raceway 21 of the outer race 2 is selected, in view of the angle $\Delta\theta$, so as to follow the tilting of the axle 4, as described previously, and therefore, the roller 3 in the main-load-zone (upper side in the drawing) is subject to the aforesaid sum of loads with the entire effective length thereof being substantially in ideal line-contact with the tapered raceway 21 of the outer race 2.

As a result, the roller and raceway in the main-load-zone may be subject to the load always in accordance with the inclination of the axle 4 without being subject to the edge load.

Figure 5:
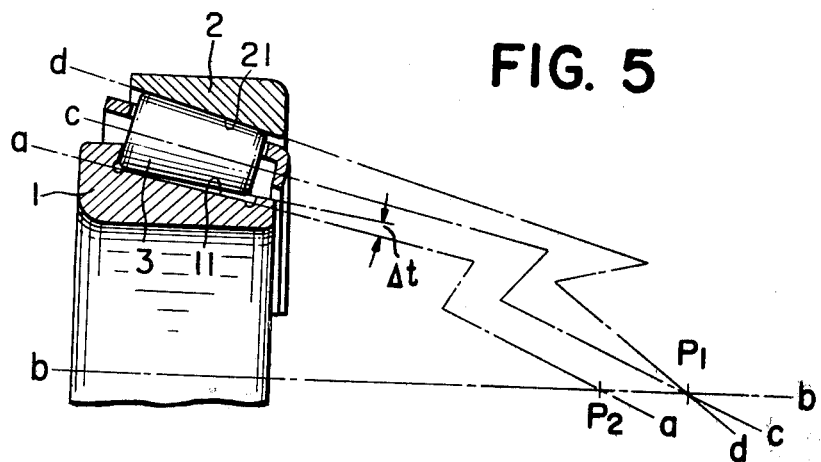
FIGS. 5, 6 and 7 show, in vertical section, further embodiments of the bearing according to the present invention.

FIG. 5 shows a further embodiment of the present invention in which there is provided a differential angle $\Delta t$ between the tapered raceway 11 of the inner race 1 and the bus line of the roller 3. The extension $d—d$ of the tapered raceway 21 of the outer race 2 and the axis $c—c$ of the roller 3 intersect each other at a point $P_1$ on the axis $b—b$ of the bearing, and the extension $a—a$ of the tapered raceway 11 of the inner race 1 intersects the axis $b—b$ at a point $P_2$ displaced inwardly of the point $P_1$.

In the above embodiments of FIGS. 3 and 5, the angle $\Delta t$ is provided so that a clearance is formed at the smaller diameter side of the bearing (right side in the FIGS. 3 and 5); however, in order to obtain the same effect, the angle $\Delta t$ may be provided so that the clearance is formed at the larger diameter side of the bearing (left side in the FIGS. 3 and 5). When the angle $\Delta t$ is provided in the latter manner in the embodiment shown in FIG. 5, the extension $a—a$ of the tapered raceway of the inner race (11) intersects the axis $b—b$ of the bearing at a point which is further from the bearing than the point $P_1$.

Figure 6:
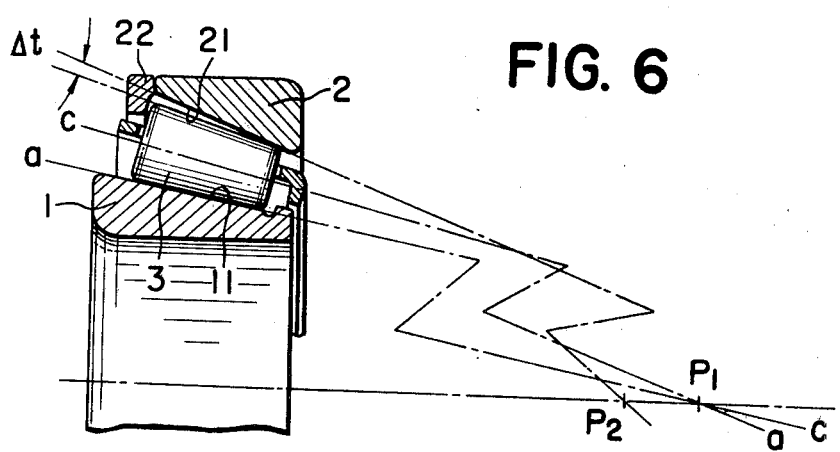

FIG. 6 shows another embodiment of the present invention in which a differential angle $\Delta t$ is provided so that a clearance is formed at the larger diameter side of the bearing. The point of intersection between the extension $a—a$ of the tapered raceway 11 of the inner race and the axis $c—c$ of the roller 3 is in accord with at point $P_1$ on the axis $b—b$ of the bearing. The extension of the tapered raceway 21 of the outer race 2 intersects the axis $b—b$ of the bearing at the point $P_2$ which is nearer to the bearing than the point $P_1$. There is provided a thrust receiving ring 22 instead of the collar 31 of the inner race (FIG. 3). The conical roller bearing as shown in FIG. 6 is mounted on the construction shown in FIG. 4, in the opposite manner as with respect to the bearing shown in FIG. 4, that is, the larger side of the bearing is located near to the flange 6.

FIG. 7 shows another embodiment of the present invention in which a differential angle $\Delta t_1$ is provided between the tapered raceway 11 of the inner race 1 and the bus line of the roller 3 and a differential angle $\Delta t_2$ is also provided between the tapered raceway 21 of the outer race 2 and the bus line of the roller 3. The points of intersection $P_1$, $P_2$ and $P_3$ between the extension $d—d$ of the tapered raceway 21 of the outer race, the axis of the roller 3, the extension $a—a$ of the tapered raceway 11 of the inner race and the axis $b—b$ of the bearing are not in accord.

In the embodiments of FIGS. 5 and 7, as well as in the embodiment of FIG. 3, tilting of the axle subjects the roller 3 in the sphere of load to a radial load with the entire effective length of the roller being substantially in ideal line-contact with the tapered raceway 21 of the outer race 2.

In the conical roller bearing according to the present invention, as described above, the bus line of the roller and at least one of the tapered raceways of the inner and outer races are engaged with each other at a certain angle therebetween when no radial load is imparted to the bearing, so that even if the bearing is inclined with the tilting of the axle during the drive under a load, the inclination of the bearing can readily follow such tilting of the axle and the roller 3 in main-load-zone can be subject to a uniform load over its entire effective length with respect to the tapered raceways; as a result, the edge load as was experienced in the prior art can be eliminated and flaking is substantially prevented from occurring to the tapered raceway of the inner or the outer race and/or in the rolling surface of the roller 3, thus greatly increasing the service life of the bearing.

Furthermore, the amount of crowning to be applied to the roller 3 in the bearing of the present invention may be smaller than in the bearing of the prior art, and this correspondingly increases the contacting length of the roller 3 to thereby minimize the reduction in the load capacity.

Figure 1:
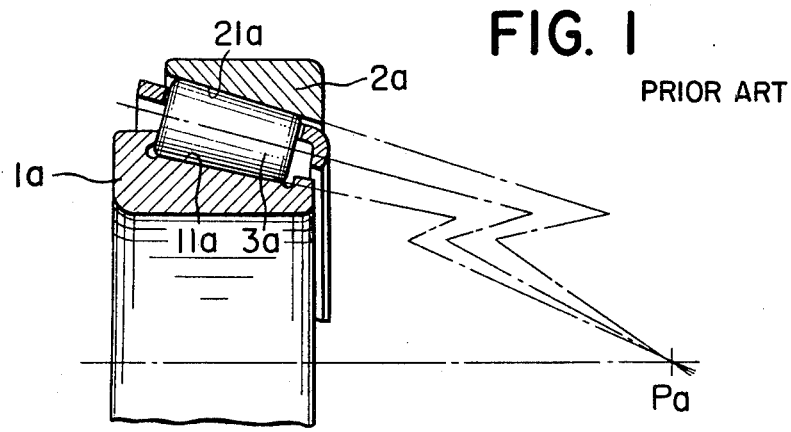
FIG. 1 is a vertical cross section of a conical roller bearing according to the prior art.
Figure 2:
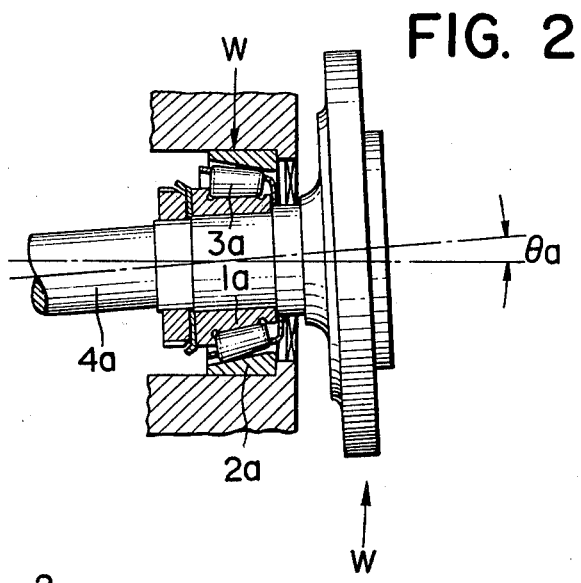
FIG. 2 illustrates the bearing of FIG. 1 as applied to the semi-floating rear axle of a motor vehicle.

In the illustrated embodiments, at least two of the three points of intersection, i.e. between the extension of the tapered raceway of the outer race and the axis of the bearing, between the extension of the tapered raceway of the inner race and the axis of the bearing, and between the axis of the conical roller and the axis of the bearing, are not in accord, whereas such discord is not esstntial to the present invention and the three points of intersection may be in accord (see FIG. 1) to achieve the same result as that described above, although in such case the angle of taper of the conical roller 3 should be varied so as to provide certain angles between the roller 3 and the tapered raceways of the inner and outer races.

The results of the test carried out to conform the effect of the bearing according to the present invention will now be considered. The test was effected on five conical roller bearings of the prior art and five conical roller bearings of the present invention, all of these different bearings having the same numerical data, and by the use of a differential gear, a rear axle and a rear axle tube as used in an actual motor vehicle. The bearings of the present invention employed in the test were of the type as shown in FIG. 3 wherein $\Delta t=10$ min. The test conditions and the data of the bearings in use were as follows:

| | |
|---|---|
| Radial load: | 920 kg |
| Thrust load: | 600 kg |
| Number of revolutions of the axle: | 780 r.p.m. |
| Outer diameter of the outer race: | 85 mm |
| Inner diameter of the inner race | 45 mm |
| Number of rollers: | 19 |
| Width of the assembly: | 24.75 mm |

These conditions were assumed for an inner rear wheel running along a curve at a vehicle velocity of 102 km/hr.

Figure 8:
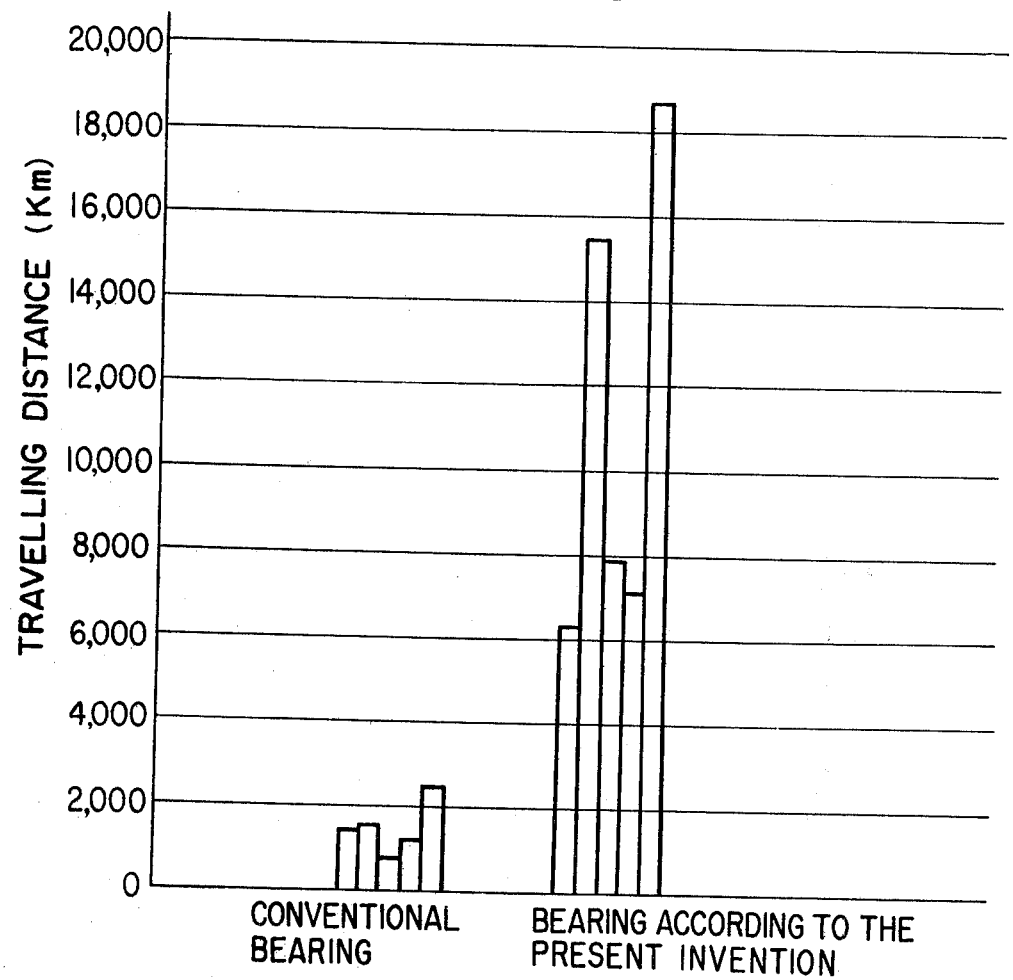
FIG. 8 shows the results of the test carried out to compare the service life of the prior art conical roller bearing and that of the inventive conical roller bearing.

The results of the test are shown in the graph of FIG. 8, where the ordinate represents the total number of revolutions of the bearing before the occurrence of flaking in the outer race, as converted into the travelling distance of the vehicle. It is seen from the graph that the bearings of the present invention are abour 2.5 times or greater in effect than that of the prior art during curved driving.

In addition to the foregoing test, an actual test running was effected on a vehicle. This latter test was done by driving the vehicle under a predetermined load, with a bearing of the prior art attached to one end of the rear axle and a bearing of the present invention attached to the other end of the same axle. The result was that the prior art bearing suffered from flaking in its outer race due to an edge load after a run of 70,000 kilometers, whereas nothing abnormal was found in the bearing of the present invention.

I claim:

1. A conical roller bearing comprising:
   a. an inner race having a tapered raceway with a substantially rectilinear portion;
   b. an outer race having a tapered raceway with a substantially rectilinear portion; and
   c. a plurality of conical rollers each having a substantially rectilinear portion partly in the rolling surface thereof and having an end crowning applied thereto, each of said conical rollers being disposed between said tapered raceways of said outer and inner races so that a portion of said rolling surface thereof is engaged with said tapered raceways, said rectilinear portions of said rollers and said rectilinear portion of at least one of said tapered raceways being engaged with each other with a given angle therebetween when no radial load is imparted to the bearing and approaching rectilinear engagement upon bearing loading.

2. A conical roller bearing according to claim 1, wherein the point of intersection between the extension of said tapered raceway of said inner race and the axis of said bearing and the point of intersection between the axis of each of said conical rollers and the axis of said bearing are not in accord, whereby said rectilinear portions of said rollers and said tapered raceway of said inner race are engaged with each other at the given angle when no radial load is imparted to the bearing.

3. A conical roller bearing according to claim 1, wherein the sum of the angles between said rectilinear portion of each of said rollers and the rectilinear portion of said tapered raceway of said outer race and the angle between said rectilinear portion of each of said rollers and the rectilinear portion of said tapered raceway of said inner race is in the range from 5 to 50 minutes.

4. A conical roller bearing according to claim 1, wherein the point of intersection between the extension of said tapered raceway of said outer race and the axis of said bearing and the point of intersection between the axis of each of said conical rollers and the axis of said bearing are not in accord, whereby said rectilinear portions of said rollers and said tapered raceway of said outer race are engaged with each other at the given angle when no radial load is imparted to the bearing.

5. A conical roller bearing comprising:
   a. an inner race having a tapered raceway with a substantially rectilinear portion;
   b. an outer race having a tapered raceway with a substantially rectilinear portion; and
   c. a plurality of conical rollers disposed between said raceways, each having a substantially rectilinear portion partly in the rolling surface thereof and having an end crowning wherein the point of intersection between the extension of said rectilinear portion of said tapered raceway of said outer race and the axis of said bearing and the point of intersection between the extension of said rectilinear portion of said tapered raceway of said inner race and the axis of said bearing are not in accord, and said rectilinear portions of said rollers and one of said tapered raceways are engaged with each other at a certain angle when no radial load is imparted to the bearing.

6. A conical roller bearing according to claim 5, wherein the axis of said bearing is disposed in the axle of a motor vehicle.

7. A conical roller bearing comprising:
   a. an inner race having a tapered raceway with a substantially rectilinear portion;
   b. an outer race having a tapered raceway with a substantially rectilinear portion; and
   c. a plurality of conical rollers each having a full crowning wherein the point of intersection between the extension of said rectilinear portion of said tapered raceway of said outer race and the axis of said bearing and the point of intersection between the extension of said rectilinear portion of said tapered raceway of said inner race and the axis of said bearing are not in accord, whereby a clearance occurs between the outer raceway and the circumferential edge of the smaller diameter end of each of said rollers, and a clearance occurs between the inner raceway and the circumferential edge of the smaller diameter end of each of said roller, one of said clearances being larger than the other when no radial load is imparted to the bearing.

* * * * *